(12) United States Patent
Koo

(10) Patent No.: US 9,673,694 B2
(45) Date of Patent: Jun. 6, 2017

(54) ELECTROMAGNETIC INDUCTION TYPE POWER SUPPLY DEVICE

(71) Applicant: TERA ENERGY SYSTEM SOLUTION CO. LTD., Hwaseong-si, Gyeonggi-do (KR)

(72) Inventor: Ja-Il Koo, Seongnam-si (KR)

(73) Assignee: FERRARISPOWER CO., LTD, Gyeonggi-do (KR)

( * ) Notice: Subject to any disclaimer, the term of this patent is extended or adjusted under 35 U.S.C. 154(b) by 90 days.

(21) Appl. No.: 14/761,938

(22) PCT Filed: Jan. 17, 2014

(86) PCT No.: PCT/KR2014/000517
§ 371 (c)(1),
(2) Date: Jul. 17, 2015

(87) PCT Pub. No.: WO2014/112827
PCT Pub. Date: Jul. 24, 2014

(65) Prior Publication Data
US 2015/0357907 A1    Dec. 10, 2015

(30) Foreign Application Priority Data

Jan. 18, 2013    (KR) ........................ 10-2013-0005968

(51) Int. Cl.
*H02M 1/32*    (2007.01)
*H01F 38/28*    (2006.01)
(Continued)

(52) U.S. Cl.
CPC .............. *H02M 1/32* (2013.01); *H01F 38/28* (2013.01); *H02J 5/005* (2013.01); *H02J 50/10* (2016.02);
(Continued)

(58) Field of Classification Search
CPC ............ H02M 1/32; H02M 5/40; H02M 7/06; H02M 7/08
See application file for complete search history.

(56) References Cited

U.S. PATENT DOCUMENTS 3,443,194 A * 5/1969 Cielo ........................ G05F 1/62
363/20
3,519,848 A * 7/1970 Vercellotti ........ G11C 11/06007
327/52
(Continued)

FOREIGN PATENT DOCUMENTS

JP    H06-70491 A    3/1994
JP    2001-112104 A    4/2001
(Continued)

*Primary Examiner* — Timothy J Dole
*Assistant Examiner* — Yusef Ahmed
(74) *Attorney, Agent, or Firm* — Masuvalley & Partners

(57) ABSTRACT

Disclosed is an electromagnetic induction type power supply device, which generates electric power through an electromagnetic induction method using a transformer from current flowing through a transmission line, can adjust an output thereof by detecting and feeding back the output, enables a transformer and a power converting unit to be added or removed as necessary. The electromagnetic induction type power supply device includes a transformer module including a plurality of transformers for outputting electric power by inducing, in an electromagnetic induction method, secondary current from primary current flowing through a transmission line; a power source module including a plurality of power converting units for converting the electric power output from the plurality of transformers to direct current power and outputting the converted power; and a power summing unit for summing the direct current power output from the plurality of transformers and providing the summed power to a load.

5 Claims, 2 Drawing Sheets

(51) Int. Cl.
*H02M 7/06* (2006.01)
*H02M 5/40* (2006.01)
*H02J 5/00* (2016.01)
*H02M 7/08* (2006.01)
*H02J 50/10* (2016.01)

(52) U.S. Cl.
CPC .............. *H02M 5/40* (2013.01); *H02M 7/06* (2013.01); *H02M 7/08* (2013.01)

(56) References Cited

U.S. PATENT DOCUMENTS

| | | | | |
|---|---|---|---|---|
| 4,152,661 A | * | 5/1979 | Zeis | H03K 7/08 330/202 |
| 4,461,987 A | * | 7/1984 | Fulton | H02M 7/525 318/729 |
| 4,739,461 A | * | 4/1988 | Komatsu | H02M 3/28 307/138 |
| 4,814,965 A | * | 3/1989 | Petersen | H02M 3/33569 363/21.12 |
| 5,121,314 A | * | 6/1992 | Cathell | H02M 3/3376 363/17 |
| 5,991,169 A | * | 11/1999 | Kooken | B23K 9/1056 219/137 PS |
| 6,028,413 A | * | 2/2000 | Brockmann | H02J 7/025 320/108 |
| 6,756,776 B2 | * | 6/2004 | Perkinson | H01F 38/30 324/126 |
| 7,388,761 B1 | * | 6/2008 | Wang | H02M 3/33576 363/17 |
| 9,330,837 B2 | * | 5/2016 | Cuadra | H01F 38/14 |
| 2001/0012207 A1 | * | 8/2001 | Nomura | H02M 3/33569 363/17 |
| 2002/0003713 A1 | * | 1/2002 | Nakawaga | H02M 1/4208 363/72 |
| 2002/0012257 A1 | * | 1/2002 | Takahama | H02M 3/337 363/95 |
| 2002/0079872 A1 | * | 6/2002 | Kim | H02M 3/28 323/267 |
| 2007/0051712 A1 | * | 3/2007 | Kooken | B23K 9/095 219/130.1 |
| 2007/0133239 A1 | * | 6/2007 | Tanaka | H02M 3/337 363/65 |
| 2009/0201707 A1 | * | 8/2009 | Park | G09G 3/20 363/126 |
| 2011/0080056 A1 | * | 4/2011 | Low | H02J 5/005 307/104 |
| 2012/0140525 A1 | * | 6/2012 | Cuadra | H01F 27/324 363/21.04 |
| 2013/0187637 A1 | * | 7/2013 | Saxby | G01R 21/00 324/127 |
| 2013/0300208 A1 | * | 11/2013 | Yu | H04B 3/56 307/104 |
| 2014/0078791 A1 | * | 3/2014 | Gurudasani | H02M 7/5387 363/37 |
| 2015/0078039 A1 | * | 3/2015 | Miyauchi | H02M 1/08 363/21.12 |
| 2015/0326031 A1 | * | 11/2015 | Yamaguchi | H02J 17/00 307/104 |

FOREIGN PATENT DOCUMENTS

| | | |
|---|---|---|
| JP | 2006-197758 A | 7/2006 |
| JP | 2012-078356 A | 4/2012 |
| KR | 10-2009-0046439 A | 5/2009 |
| WO | 2007/034894 A1 | 3/2007 |

* cited by examiner

ELECTROMAGNETIC INDUCTION TYPE POWER SUPPLY DEVICE

RELATED APPLICATIONS

This application is the U.S. National Phase of and claims priority to International Patent Application No. PCT/KR2014/000517, International Filing Date Jan. 17, 2014, entitled Electromagnetic Induction Type Power Supply Device, which claims benefit of Korean Patent Application No. 10-2013-0005968 filed Jan. 18, 2013; both of which are incorporated herein by reference in their entireties.

TECHNICAL FIELD

The present disclosure relates to an electromagnetic induction type power supply device, and more particularly, to an electromagnetic induction type power supply device, which generates necessary power through an electromagnetic induction method using a current transformer from an current flowing through a transmission line, may adjust an output by detecting and an output voltage and current and providing feedback, enables a current transformer and a power converting unit to be added or removed as necessary, thereby increasing availability, and can supply power stably.

BACKGROUND ART

In general, an electromagnetic induction type power supply device that is based on a current transformer is installed on a power link in which a large amount of current flows, such as a power line, a bare conductor line or a busbar, to induce a current from the power link, generate power by using the induced current and supply actuating power to equipment needing power (hereinafter, referred to as "power-needing equipment").

A typical current induction type power supply device includes a current transformer that induces an alternating current (AC) current from the power link, and a rectifier that converts the AC current induced from the current transformer into direct current (DC) power and transmits the DC power to a device needing power (hereinafter, referred to as "power-needing device").

However, such a typical power supply device has the following limitations.

(1) Since a current flowing in the power link is interrupted when the power link is out of order, is replaced or repaired, an induced current is not generated and thus there is a limitation in that it is difficult to supply power.

(2) When a typical cylindrical current transformer is used, there is a limitation in that there is a need for the current transformer to be installed or separated when the power link is initially installed or artificially after power supply to the power link is cut off.

(3) When the load of the power-needing device changes, there is a limitation in that there is a need for a new power supply device to be designed and manufactured because it is difficult to increase and decrease the output of a power supply device as necessary.

(4) Since power generated in the process of inducing over-current by the current transformer is transmitted to the power-needing device as it is or is not used up by the power supply device for a necessary time, there is a limitation that adversely affects the lifespan of power-needing equipment or the lifespan of the power supply device.

(5) Even if over-current is not generated by the current transformer, there is a limitation that adversely affects the power supply device and the power-needing equipment by generating and supplying unnecessary power because there is no need to supply power exceeding power needed by the power-needing device.

(6) Even when the size of a current flowing in a general power link decreases to 15 A, it is possible to configure a system that may supply power to a minimum of a power-needing device only when each current transformer has to generate at least 1.2 W or more power, but since most typical current transformer based power supply devices need a minimum power link current of 30 A or more, depends on a switch operation according to the size of a line current or has an auxiliary battery for the operating source of an internal power supply device, there is a limitation in application places that do not correspond to the needs of the minimum current of the general power link.

(7) In a structure that includes a plurality of current transformers, the outputs of the current transformers are connected in parallel to be connected directly to a single power supply module unit to increase an output, but when the current transformers do not have the same characteristics, the output summed by interaction does not linearly increase and thus there is a limitation in that the uniformity of the output quality of a power supply device decreases.

(8) Since a typical electromagnetic induction type power supply device is designed and manufactured in such a manner that a current transformer and a power converting unit independently operate, there are limitations in that it is difficult to perform module-dependent management according to individual performance and output and even the same system experiences a significant variation in performance according to installation methods and orders.

DISCLOSURE OF THE INVENTION

Technical Problem

Embodiments provide an electromagnetic induction type power supply device that may enable a current transformer or a power converting unit and the current transformer to be simply added or removed in a situation in which the main power supply of a power link normally operates as necessary, to linearly increase or decrease power capable of being generated to always secure minimum power needed by a power-needing device, have control and protection functions of preventing an internal power generation circuit from generating over-current or excessive power to prevent equipment from malfunctioning and becoming damaged, arbitrarily adjust the maximum output of each current transformer and supply power depending on the situation.

Technical Solution

In one embodiment,
an electromagnetic induction type power supply device includes:
a current transformer module comprising a plurality of current transformers, which induces, by electromagnetic induction, a secondary current from a primary current flowing in a line to output power;
a power supply module comprising a plurality of power converting units, which converts the power output from the plurality of current transformers into direct current (DC) power and outputs the converted power; and
a power summing unit summing the DC power output from the plurality of power converting units to provide the summed power to a load.

The number of the plurality of current transformers of the current transformer module and the number of the plurality of power converting units of the power supply module may vary according to a specification of a device requiring power.

The power converting unit may include a primary rectifier unit converting induced power provided from the current transformer into a DC voltage; a switching circuit unit switching and outputting the DC voltage converted by the primary rectifier unit by pulse width modulation; and a secondary rectifier unit converting, into a DC voltage, a voltage inducted by the voltage output from the switching circuit unit.

The primary rectifier unit may convert induced power provided from the current transformer into a DC voltage to provide the DC voltage to the switching circuit unit when a size of the current provided from the current transformer is within a preset size of a reference current. Also, the primary rectifier unit may interrupt or bypass a current exceeding the range of the reference current to perform a protection function against from an over-current.

The power converting unit further comprises a feedback circuit unit that receives an output of the secondary rectifier unit and an output of the power summing unit as feedback and controls pulse width duty of pulse width modulation performed by the switching circuit unit.

The current transformer may be a separable current transformer that is added to or removed from the line, and the power converting unit may further include a damping circuit unit for adjusting magnetization of the current transformer to be separated from the line of the current transformer.

The electromagnetic induction type power supply device may further include a DC/alternating current (AC) converting unit converting an output of the power summing unit into AC power.

Advantageous Effects

According to the present invention, by generating main power through an electromagnetic induction method from a current flowing in a line and supplying the power to power-needing equipment, it is possible to stably supply power irrespective of a current flowing in the line, and by adding or removing a current transformer and a power supply device irrespective of a line current easily as necessary, it is possible to enhance the easiness of power management.

According to the present invention, even when the power demand of power-needing equipment changes, it is possible to secure necessary power by simply adding or removing a current transformer or power converting unit and the current transformer, and by using a separable current transformer that may be added and removed, it is also possible to increase the convenience of installation and management irrespective of the condition of a distribution line.

According to the present invention, since the output of each of a plurality of power supply devices and a final output obtained by summing the outputs of the plurality of power supply devices are redundantly feedback to be reflected to power control, it is possible to enhance the stability of a product and it is also possible to provide the final output constantly to enhance output quality even when the performance of each current transformer is not constant.

MODE FOR CARRYING OUT THE INVENTION

In the following, an embodiment of the present invention is described in more detail with reference to the accompanying drawings. However, the embodiment of the present invention may be varied in different forms and the scope of the present invention is not limited to the embodiment described below. The embodiment of the present invention is provided to more fully explain the present invention to a person skilled in the art. Also, since in describing the present invention, defined terms are defined in consideration of functions in the present invention and may vary according to the intention or practice of a person skilled in the art, the terms should not be understood as limiting the technical component of the present invention.

Figure 1:
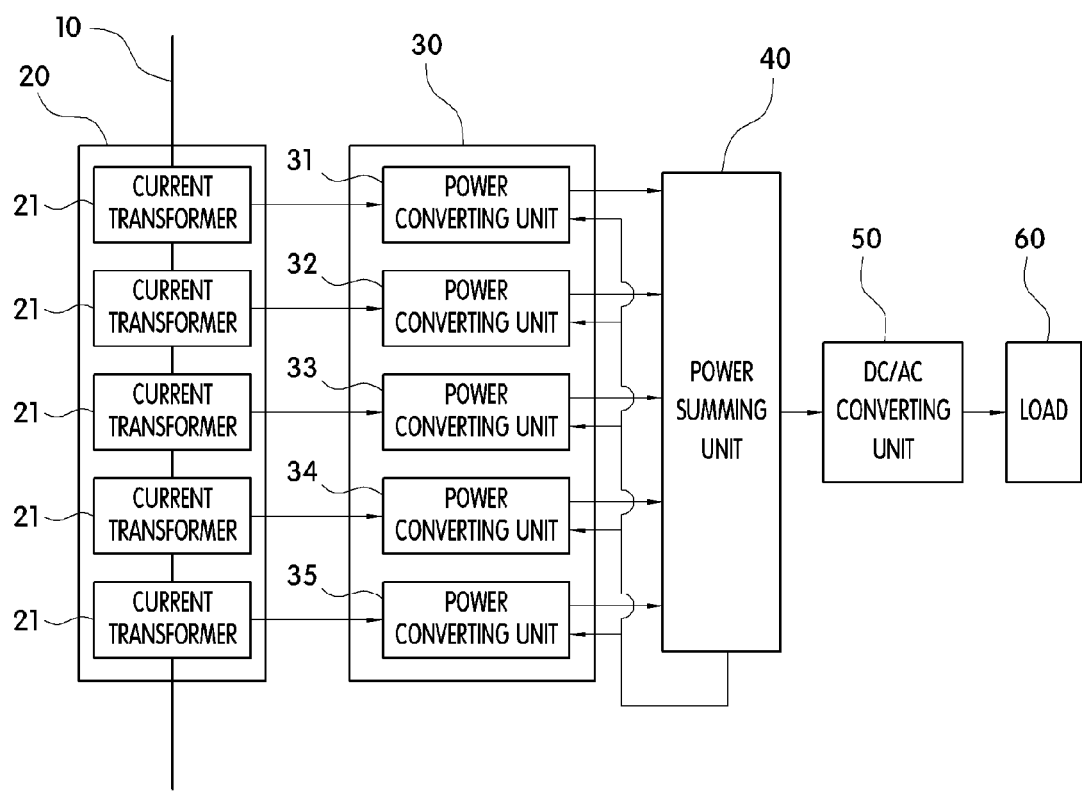
FIG. 1 is a block diagram of an electromagnetic induction type power supply device according to an embodiment of the present invention.

FIG. 1 is a block diagram of an electromagnetic induction type power supply device according to an embodiment of the present invention.

Referring to FIG. 1, the electromagnetic induction type power supply device according to the embodiment of the present invention may include a current transformer module 20, a power supply module 30, and a power summing unit 40.

The current transformer module 20 may include a plurality of current transformers 21 to 25. Each of the plurality of current transformers 21 to 25 may induce a current from a power link in which a large amount of currents flows, such as a power line, a bare conductor line, or a busbar. Typically, the power link in which the large amount of currents flows may be referred to as a line. The current transformers 21 to 25 may include a secondary winding that may induce a primary current flowing in a line that is a primary winding, and output the induced current to the secondary winding by electromagnetic induction according to the large amount of currents flowing in the primary winding.

The power supply module 30 may receive a secondary current induced and output by electromagnetic induction at the plurality of current transformers 21 to 25 in the current transformer module 20, convert the received current into a direct current (DC) voltage having a desired size, and output the converted current. To this end, the power supply module 30 may include a plurality of power converting units 31 to 35 that receives the secondary current output from each of the current transformers 21 to 25 and converts the received current. Each of the plurality of power converting units 31 to 35 may receive the secondary current output from one or a plurality of current transformers 21 to 25, convert the received current to a DC current and output the DC current.

The power supply module 30 may be implemented to be capable of changing the number of the power converting units. That is, it is possible to add or remove the power converting units 31 to 35 in the power supply module 30 according to the size of power required by a load 60 so that approximate power required by a power-needing device may be output.

Figure 2:
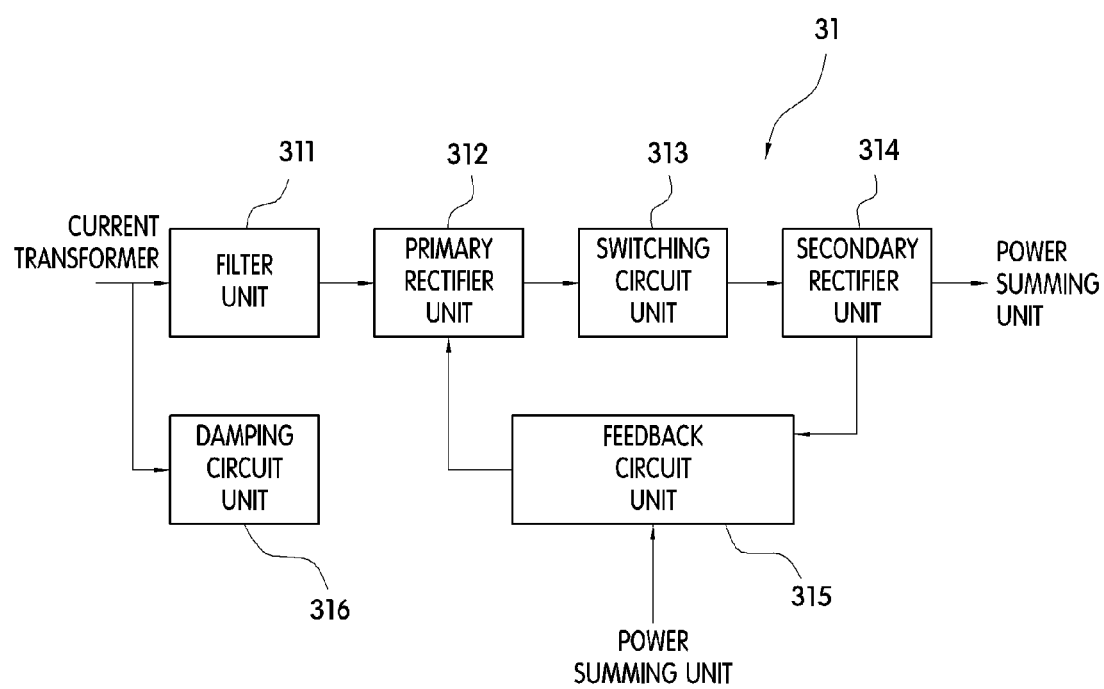
FIG. 2 is a detailed block diagram of a power converting unit in an electromagnetic induction type power supply device according to an embodiment of the present invention.

FIG. 2 is a detailed block diagram of a power converting unit in an electromagnetic induction type power supply device according to an embodiment of the present invention.

Referring to FIG. 2, the power converting unit 31 may include a filter unit 311, a primary rectifier unit 312, a control unit 313, a secondary rectifier unit 314, and a feedback circuit unit 315. In addition, the power converting unit 31 may further include a damping circuit unit 316 for the magnetization control of the current transformers 21 to 25 that enables the addition and removal of the current transformers 21 to 25.

The filter unit 311 is used for performing filtering on an induced current output from the current transformers 21 to 25 that provides secondary current, and is a filter for removing electromagnetic interference (EMI) or other noise.

The primary rectifier unit 312 may convert power received from the current transformers 21 to 25 into a DC voltage. For example, the primary rectifier unit 312 may include a bridge diode and a smoothing capacitor. Also, the primary rectifier unit 312 may transmit power to the next stage when the size of a voltage or current received from the current transformers 21 to 25 is within a preset reference size. The size of the reference current may be adjusted by external manipulation and thus it is possible to adjust maximum power that may be supplied by a single power converting unit. By interrupting or bypassing a current exceeding the reference current, the primary rectifier unit 312 may prevent the output of excessive power and perform a protection function.

In order to output a stable DC current, the switching circuit unit 313 may adjust the duty of a switching device therein by using pulse width modulation (PWM) to provide a DC voltage. The switching circuit unit 313 may be implemented in a PWM control integrated circuit (IC) that includes the switching device (e.g., MOSFET) therein.

The secondary rectifier unit 313 may include a transformer that has a primary winding receiving the power of the primary rectifier unit 312 provided by the switching circuit unit 313 and a secondary winding electromagnetically coupled to the primary winding and outputting a current induced by a current flowing in the primary winding, and a diode that rectifies and smoothes a voltage induced to the secondary winding of the transformer.

In an embodiment of the present invention, the secondary rectifier unit 313 may rectify the voltage value of power provided via the switching circuit unit 313 to a preset size. The secondary rectifier unit 313 may provide, to the feedback circuit unit 315, the output of the secondary rectifier unit 313 capable of varying according to the size of the load 60 so that the output does not significantly vary according to a load variation.

The feedback circuit unit 315 may perform a protection operation of resetting the switching operation of the switching circuit unit 313 when AC power provided by the current transformers 21 to 25 has overvoltage. Also, the feedback circuit unit 315 may detect and receive the size of the output of the power converting unit 31 provided from the secondary rectifier unit 314 to the power summing unit 40 and adjust the duty of the switching circuit unit 313 to be capable of maintaining the size of an output voltage constantly.

Also, the feedback circuit unit 315 may detect and receive the size of a voltage and current provided from the power summing unit 40 to the load 60, and perform a protection operation such as stopping or resetting the operation of the switching circuit unit 313 for system protection when a final output voltage provided to the load 60 excessively increases.

Referring back to FIG. 1, the power summing unit 40 sums power output to each of the power converting units 31 to 35 in the power supply module 30 and provides the summed power to the load 60. Also, the power summing unit 40 may provide the size of a final output voltage to the feedback circuit 315 of the power converting units 31 to 35 to control the operation of each power converting unit 35 according to the final output voltage.

Selectively, an embodiment of the present invention may further include a DC/AC converting unit that converts DC power output from the power summing unit 40 into AC power. When a device corresponding to a load requiring power needs AC power, an embodiment of the present invention may selectively include the DC/AC converting unit 50 to provide an appropriate type of power required by the load 60.

In an embodiment of the present invention, the power converting unit 31 may include a damping circuit unit 316. The damping circuit unit 316 may be installed for the replacement of the current transformers 21 to 25 to which the power converting unit 31 to which the damping circuit unit belongs is connected. For example, when a line current equal to or more than 15 A flows, the current transformers having a separable structure are mutually coupled by an induced magnetic force by an induced voltage occurring at each current transformer and thus it is not easy to separate them by a physical force. That is, since it is significantly difficult to separate the current transformers having the separable structure when a current flows in a line, it is difficult to separate the current transformers without interrupting the current flowing in the line. An embodiment of the present invention includes the damping circuit unit 316 for controlling the induced magnetism of a current transformer as necessary. By including such a damping circuit unit 316, an embodiment of the present invention may easily add or remove a current transformer having a separable structure even in a situation in which a line current flows.

In an embodiment of the present invention as described above, it is possible to linearly add each power converting unit 31 and the output voltage of each power converting unit 31 is summed through the power summing unit 40 so that the summed voltage may be finally output to the load 60. Also, since an embodiment of the present invention is implemented in a redundant feedback structure in which the output of the secondary rectifier unit 314 in the power converting unit 31 and the final output of the power summing unit 40 are feedback to be reflected to power control, it is possible to enhance the stability of a product and it is also possible to provide the final output constantly even when the performance of each current transformer is not constant. In particular, since the related art designs a power supply unit according to power obtained by summing the output of each current transformer, each CT output having non-uniform performance interferes with one another and thus there is a limitation in that an output decreases or is non-uniform, and since the design of the power supply unit involves a high-current design, there are limitations in that it is difficult to design the power supply unit and the power supply design adversely affects performance, but since an embodiment of the present invention may design so that one current transformer corresponds to one power converting unit, it is possible to enhance the performance of a product and it is also possible to easily adjust the final output because there is only a need to add the current transformer or power converting unit according to a desired output.

Also, an electromagnetic induction type power supply device according to an embodiment of the present invention may apply to various work sites because it is possible to set an output according to the situation of a line current, be used as the main power supply of various pieces of equipment needing power because desired power is sufficiently secured when only a line current equal to or more than e.g., 15 A is secured.

Although the detailed description of the present invention has described particular embodiments, many variations may also be implemented without departing from the scope of the present invention. Therefore, the scope of the present invention is not limited to the above-described embodiments and should be defined by the scope of the claims and equivalents thereof.

The invention claimed is:

1. An electromagnetic induction type power supply device comprising:
    a current transformer module comprising a plurality of current transformers, which induces, by electromagnetic induction, a secondary current from a primary current flowing in a line to output power;
    a power supply module comprising a plurality of power converting units, which converts the power output from the plurality of current transformers into direct current (DC) power and outputs the converted power; and
    a power summing unit summing the DC power output from the plurality of power converting units to provide the summed power to a load;
    wherein at least one of the power converting units comprises:
    a primary rectifier unit converting induced power provided from the current transformer into a DC voltage;
    a switching circuit unit switching and outputting the DC voltage converted by the primary rectifier unit by pulse width modulation; and
    a secondary rectifier unit converting, into a DC voltage, a voltage induced by the voltage output from the switching circuit unit;
    wherein at least one of the current transformers is a separable current transformer that is added to or removed from the line, and the at least one of the power converting units further comprises a damping circuit unit for adjusting magnetization of the current transformer to be separated from the line of the current transformer module.

2. The electromagnetic induction type power supply device of claim 1, wherein the number of the plurality of current transformers of the current transformer module and the number of the plurality of power converting units of the power supply module vary according to a specification of a device requiring power.

3. The electromagnetic induction type power supply device of claim 1, wherein the primary rectifier unit converts induced power provided from the at least one of the current transformers into a DC voltage to provide the DC voltage to the switching circuit unit when a size of the current provided from the at least one of the current transformers is within a preset size of a reference current, and the primary rectifier unit interrupts or bypasses a current exceeding the size of the reference current to interrupt an over-current.

4. The electromagnetic induction type power supply device of claim 1, wherein the at least one of the power converting units further comprises a feedback circuit unit that receives an output of the secondary rectifier unit and an output of the power summing unit as feedback and controls pulse width duty of pulse width modulation performed by the switching circuit unit.

5. The electromagnetic induction type power supply device of claim 1, further comprising a DC/alternating current (AC) converting unit converting an output of the power summing unit into AC power to provide the AC power to the load.

* * * * *